United States Patent [19]
Mukaidono et al.

[11] Patent Number: 5,345,138
[45] Date of Patent: Sep. 6, 1994

[54] METHOD AND APPARATUS FOR ASSURING SAFE WORK

[75] Inventors: Masao Mukaidono, Tokyo; Noboru Sugimoto, Koganei; Koichi Futsuhara, Urawa, all of Japan

[73] Assignee: The Nippon Signal Co., Ltd., Tokyo, Japan

[21] Appl. No.: 669,563

[22] Filed: Mar. 14, 1991

[30] Foreign Application Priority Data

Jul. 16, 1990 [JP] Japan .................. 2-185214

[51] Int. Cl.$^5$ .................................. H01H 47/24
[52] U.S. Cl. .................. 307/326; 307/117
[58] Field of Search ............. 307/415, 117, 326–328; 49/25–28; 192/129 R, 129 A; 323/250; 363/91; 331/111, 143, 63, 185

[56] References Cited

U.S. PATENT DOCUMENTS

| | | |
|---|---|---|
| 2,331,023 | 10/1943 | Gayring . |
| 3,171,062 | 2/1965 | Rowe, Jr. ................... 361/50 |
| 3,546,476 | 12/1970 | Frase ..................... 307/413 |
| 3,742,222 | 6/1973 | Endl . |
| 3,805,085 | 4/1974 | Andrews . |
| 3,829,850 | 8/1974 | Guetersloh ............... 361/187 X |
| 3,911,324 | 10/1975 | Bishop .................... 363/91 X |
| 3,944,818 | 3/1976 | Bechtel . |
| 3,947,734 | 3/1976 | Fyler ..................... 361/181 |
| 4,291,359 | 9/1981 | Dieterle ................. 307/326 X |
| 4,309,696 | 1/1982 | Nagai et al. ............. 192/129 R X |
| 4,661,880 | 4/1987 | Futsuhara ................ 361/93 |
| 4,733,081 | 3/1988 | Mizukami ................. 49/25 X |
| 4,859,869 | 8/1989 | Heuwinkel et al. ......... 307/116 X |
| 5,027,114 | 6/1991 | Kawashima et al. ......... 340/941 |

FOREIGN PATENT DOCUMENTS 509999 7/1976 Australia .

Primary Examiner—A. D. Pellinen
Assistant Examiner—F. M. Fleming
Attorney, Agent, or Firm—Lowe, Price, LeBlanc & Becker

[57] ABSTRACT

A method for assuring a safe work space operates so that a work enable signal is generated only when absence of workers from the work space where the workers work in cooperation with a machine is detected. The work enable signal has a logical value of 1 corresponding to a high energy state and only this signal can initiate activation of the machine sharing the subject work space thereby assuring safe environments for workers.

9 Claims, 4 Drawing Sheets

METHOD AND APPARATUS FOR ASSURING SAFE WORK

BACKGROUND OF THE INVENTION (1) Field of the Invention

The present invention relates to a method and an apparatus for assuring working safety. More particularly, this invention pertains to a method and an apparatus which can surely provide safe work environments for workers.

(2) Description of the Related Art

For installations involving a working system which permits a movable section of a machine and men to work cooperatively, such as gas facilities which include the possibility of an explosion, it is extremely important to maintain safety measures for the workers.

When men and machines alternately work in a common work space, accidents may occur when the movable sections of a machine collide with part of a worker's body or the machine's electric power is transmitted to a worker's body. For example, in the case where a man carries work in the work space and a robot processes it, an accident is likely to occur when the arm of the robot hits against part of the man's body.

A typical conventional safety assuring system for use in such a working system is designed in such a way that an optical signal from an optical radar sensor is emanated onto the working area of the movable section of a machine, and any work involving the movable section of the machine will be stopped when the optical signal is reflected by a worker and received by the sensor, which indicates the presence of a dangerous environment. That is, the conventional safety assuring system is realized based on the concept that work on the machine side should be terminated upon detection of a dangerous condition or environment (man or men present in the work space).

With the use of such a conventional safety system, however, when the signal-emitting section of the optical radar sensor fails for some reasons and no optical signal is sent to the working area, the optical signal will not be received even if a worker or workers are in the working area of the movable section of a machine. In this case a problem in that the erroneous determination that no workers are present is made, so that the work of the machine's movable section continues, resulting in a dangerous condition. In other words, there are some situations which the conventional safety systems cannot cope with to provide safe work environments for workers.

SUMMARY OF THE INVENTION

It is therefore an object of the present invention to provide a method and an apparatus for assuring a safe work environment.

To achieve this object, according to a safe work assuring method of the present invention, assuring safety of a worker in a work space where the worker works in cooperation with a machine, with an output energy status expressed as a binary variable represented by logical values 1 and 0, generation of work executing energy for the machine sharing the work space is permitted only when a work enable signal of a logical value of 1 corresponding to a high energy status is generated and, further, at least the work enable signal is prevented from erroneously become a logical value of 1.

Since the present method is designed such that work executing energy on the machine side for the work space is generated only when the work enable signal of a logical value of 1 corresponding to the high energy status is issued, the work enable signal for the high energy status will not be generated even when a sensor for detecting safety fails. In this way collision of a machine with men can be prevented, thus surely assuring safe work environments.

The work enable signal may be generated only when the sensor detects a safe status in which no workers are present in the work space or when the sensor detects a safe status in which a worker is in safe space other than the work space.

Further, the sensor may be designed to detect a safe status upon reception of an input of a logical value of 1 corresponding to the high energy status, and the work enable signal to be generated by the sensor does not include a logical negation. In this case, when the sensor fails, the sensor will be prevented from producing an output of a logical value of 1 corresponding to the high energy status.

Furthermore, the method may be modified in such a way that given that information representing a safe status and a dangerous status are expressed respectively by binary logical values of 1 and 0 and also, a status where an energy is received by the sensor detecting safe or dangerous status and a status where an energy is not received by the sensor are expressed respectively by binary logical values of 1 and 0, an energy status received by the sensor and safety information to be sent based on the energy status coincide with each other as a logical value of 1. This will result in further improvement of the fail-safe.

A safe assuring apparatus according to the present invention comprises a sensor for detecting a safety of a worker and generating a work enable signal of a logical value of 1 corresponding to a high energy status to permit working of a movable section of a machine, given that an output energy status is expressed as a binary variable represented by logical values 1 and 0; and a logical product element for sending a drive signal of a logical value of 1 corresponding to a high energy status for the movable section of the machine to the machine side as an output signal for generation of work executing energy only upon reception of the work enable signal of a logical value of 1 from the sensor and for generating no work executing energy when it fails.

With this arrangement, the sensor generates a work enable signal of a logical value of 1 corresponding to a high energy status when detecting the safety of a worker in the work space, and the logical product element sends a drive signal for the movable section of the machine to the machine side as its output signal for generation of this work executing energy only upon generation of this work enable signal. When the sensor fails, therefore, the sensor output represents a low energy status and when the logical product element fails, the logical product element output represents a low energy status, so that the movable section of the machine will not be driven, thus assuring safe work environments.

The sensor may be designed to detect the safe status upon reception of a logical value of 1 corresponding to the high energy status and output the work enable signal without involving a negation circuit. Even if the sensor ,i fails, the sensor is prevented from producing an output of a logical value of 1 corresponding to the high energy status.

The logical product element may be designed to produce an output only when an input signal of a higher level than that of a power supply voltage is applied to two input terminals of the logical product element. This can provide such a fail-safe measure that the logical product element will not generate an output of a logical value of 1 corresponding to the high energy status whatever failure occurs in the logical product element, thus ensuring higher safety.

DETAILED DESCRIPTION OF THE PREFERRED EMBODIMENT

A method and an apparatus for assuring safe work according to the present invention will be understood from the following detailed description of a preferred embodiment.

The embodiment is explained with reference to a man/machine working system in the case where men and machines alternately work in common work space.

Figure 1:
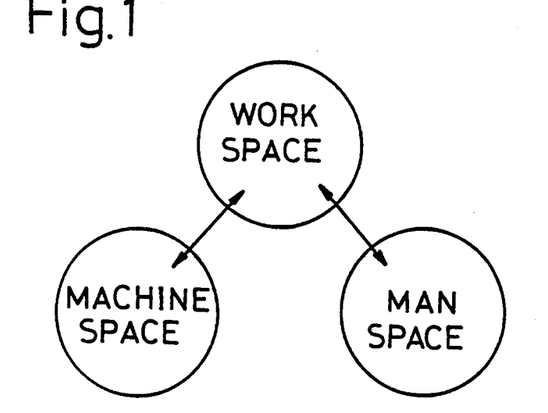
FIG. 1 is a diagram illustrating a model of a man/machine working system to which the present invention is applied.

FIG. 1 shows a model of the man/machine working system according to this embodiment. "Work space" means the space where men (workers) and a movable section of a machine, such as the arm of a robot, alternately work; for example, a worker would carry work in this space and the machine processes it. "Machine space" and "man space" mean safe space, i.e., space where the movable section of the machine will not collide against the workers or is kept by a safe distance away from the latter.

To prevent a collision between men and the machine's movable sections, the above man/machine working system should be so designed that men enter the work space while at least the machine's movable section is out of the space, or vice versa.

Figure 2:
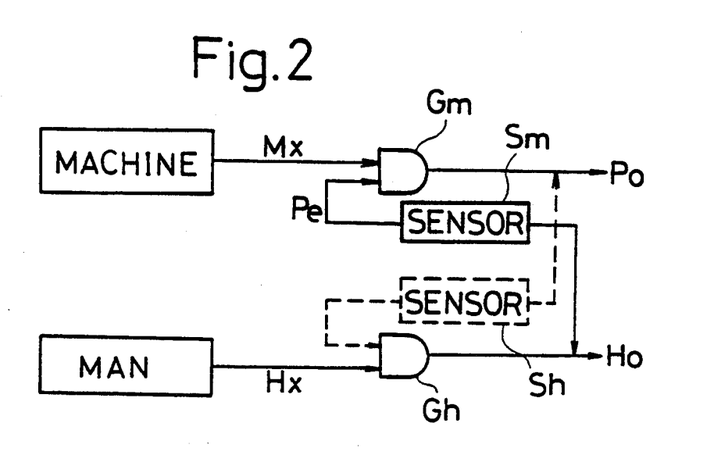
FIG. 2 is a diagram showing a system structure that can ensure safety in the working system.

FIG. 2 illustrates a model of this safe work assuring system.

Mx, Pc, Hx, and Ho are binary logical variables. Mx indicates an intention that the movable section of a machine in the machine space will move to the work space in response to a command ("1" for the presence of the intention and "0" for no intention). Pc represents work executing energy of the machine's movable section in the work space ("1" for energy present and "0" for no energy). Hx indicates an intention that men in the man space will move to the work space ("1" for the presence of the intention and "0" for no intention), and Ho work executing energy of men in the work space ("1" for energy present and "0" for no energy).

For a man to enter the work space and begin working (Ho=1), a sensor Sh should detect that the machine's movable section is not working in the work space, then a work enable signal (logical value of 1) from the sensor Sh is compared with the work intention of the man, Hx=1, by means of a logical product element Gh, and the human intention Hx=1 is output as Ho=1. In this case, the sensor Sh is the eyes of the man, and the logical product element Gh is the man's brain. For the machine's movable section to move in the work space to do the required work (Po=1), a sensor Sm should detect that nobody is working in the work space, then a work enable signal Pe(Pe=1) from the sensor Sm is compared with the intention of the machine's movable section, Mx=1, by a logical product element Gin, and the intention of the machine's movable section Mx=1 is output as Po=1. The intention Mx of the movable section of the machine means, for example, a work command issued from a controller provided on the machine side.

Figure 3:
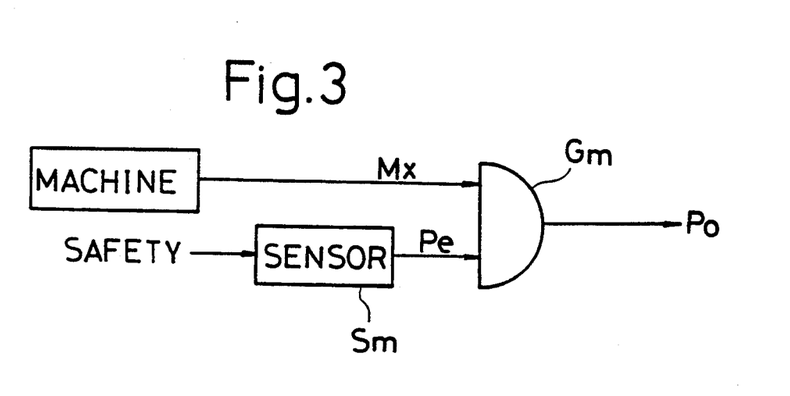
FIG. 3 is a model diagram exemplifying how to realize a safety system according to the present invention.

It is presummed that men will not risk themselves if they know that the work is actually dangerous. To ensure safe work environments, it is inevitable that the movable sections of machines are designed to execute their own work only when men are not working in the work space, i.e., only when the work enable signal (logical value of 1) is sent from the sensor Sm. In other words, the structure shown in FIG. 3 is necessary to realize a safe working system which can assure the safe work environments. In FIG. 3, the work enable signal Pe is determined based on received information of safety in the work space; Pe=1 (energy present) when safe or nobody is in the work space, and Pe=0 (no energy) when it is dangerous to work or when men are in the work space.

A method for designing a sensor for the safe working system shown in FIG. 3 is described below referring to FIGS. 4 and 5.

Information indicating safety (safety information) is represented by a binary logical variable S, and that "S=1" means a safe status and "S=0" a dangerous status.

Figure 4:
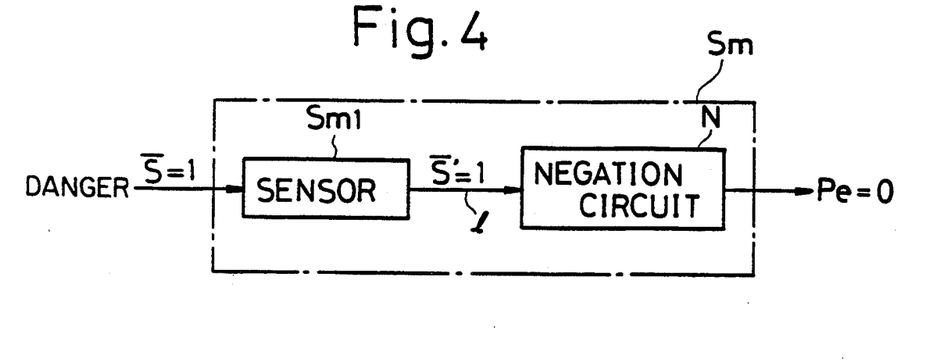
FIG. 4 is a diagram for explaining the structure of a sensor which cannot be employed in the present invention.

In FIG. 4, $\overline{S}$ is the negation of the logical variable S that indicates the safe status ($\overline{S}$=1 indicates a dangerous status with energy present, while $\overline{S}$=0 means a safe status with no energy). A sensor $S_{m1}$ and a negation circuit N constitute the sensor Sm in FIG. 3.

With the above-described structure, the sensor $S_{m1}$ detects the dangerous status ($\overline{S}$=1), and the detection resultant ($\overline{S}'$=1) is negated by the negation circuit N. Based on the negation result (S=1), an output signal, Pe =0, is generated.

If the negation circuit N is normal when the logical value of the input signal to the negation circuit N becomes "0", the work enable signal Pe=1 indicating the safe status is output. This signal output is also generated when a line 1 that connects the sensor $S_{m1}$ to the negation circuit N is disconnected. Specifically speaking, according to the sensor structure shown in FIG. 4, the work enable signal Pe=1 indicating the safe status may erroneously be produced if a failure occurs on the input side of the negation circuit N fails.

Figure 5:
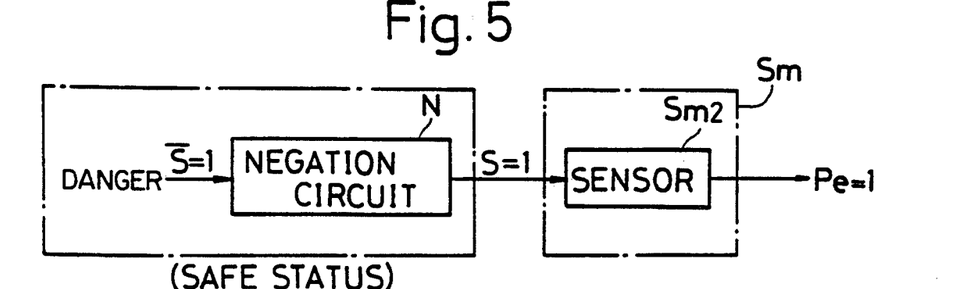
FIG. 5 is a diagram of the basic structure of a proper sensor for use in the present invention.

Referring to FIG. 5, a sensor $S_{m2}$ detects information of the result of negating the dangerous status S in the negation circuit N, and outputs the work enable signal Pe as the detection result. The sensor $S_{m2}$ corresponds to the sensor Sm in FIG. 3.

The sensor $S_{m2}$ detecting the negation of the dangerous status $\bar{S}$ means the direct detection of the safe status (S=1) by the sensor $S_{m2}$ provided that the negation circuit N shown in FIG. 65 is interpreted as a negative operation or a sensor structure involving negation. In this case, if the sensor $S_{m2}$ is designed to always output the signal Pe=0 when it malfunctions (i.e., the sensor $S_{m2}$ is designed fail-safe), the work enable signal Pe will be Pe=0 when a failure occurs on the input side of the sensor $S_{m2}$ and the work enable signal Pe to permit the machine's movable section to do its work will not erroneously be Pe=1 as shown in FIG. 4. Provided that the sensor $S_{m1}$ is designed fail-safe in FIG. 4, if the sensor $S_{m1}$ fails and erroneously gives an output $\bar{S}'=0$, the work enable signal Pe=1 will be output regardless of the input signal S to the sensor. That is, the safe status (S=1) is directly detected in the circuit in FIG. 5 without the negation calculation in the circuit of FIG. 4.

In other words, in the safe work assuring system in FIG. 3, the sensor Sm needs to directly detect the safe status (S=1), the sensor Sm must not erroneously output Pe=1, and the logical product element Gm must not erroneously output Po=1. Referring to FIG. 3, the logical variable S indicating the safety information, the work enable signal Pe and the output signal Po should have such a relationship (unate logical relationship) that at least the logical value will not erroneously become "1". Namely, a logical relationship of S≧Pe≧Po (provided 1>0) should be established among the binary logical variable S, the signals Pe and Po having two logical values, respectively. The relationship of S≧Pe means that each logical relationship of S=1, Pe=1; S=1, Pe=0; and S=0, Pe=0 is allowed, however, the logical relationship of S=0, Pe=1 is not allowed. Similarly, the relationship of Pe≧Po means that each logical relationship of Pe=1, Po=1; Pe=1, Po=0; and Pe=0, Po=0 is allowed, however, the logical relationship of Pe=0; Po=1 is not allowed. In other words, the negation calculation is not allowed.

On the other hand, the logic state on the machine side, Mx, is allowed to erroneously become "1" if the logical product element Gm has such a characteristic (that is, the characteristic Pe≧Po) that it will never transfer Mx=1 as Po=1 even when malfunctioning. That is, provided that the work space the safety in which should be secured is in the safe status (S=1), even if Mx=1 is erroneously generated, resulting in the output Po=1, there will occur no real damage; at least no accidents will occur. As described above, with the work enable signal Pe=0 (the work space is not safe), even when the logical product element Gm malfunctions, to have this particular characteristic, the two-input logical product element Gm should at least be designed never to output Pc=1 by a single input signal. In this respect, a C-MOS type (or the logical product element that can always satisfy Pe≧PO) two-input logical product circuit which is used for ordinary logical operations may produce an output of a logical level corresponding to a high energy status when it fails, or may generate an output signal indicating the high energy status even if only one of its two input signals is available. This type of logical product circuit cannot therefore serve as a logical product element in the safety system shown in FIG. 3.

Figure 6:
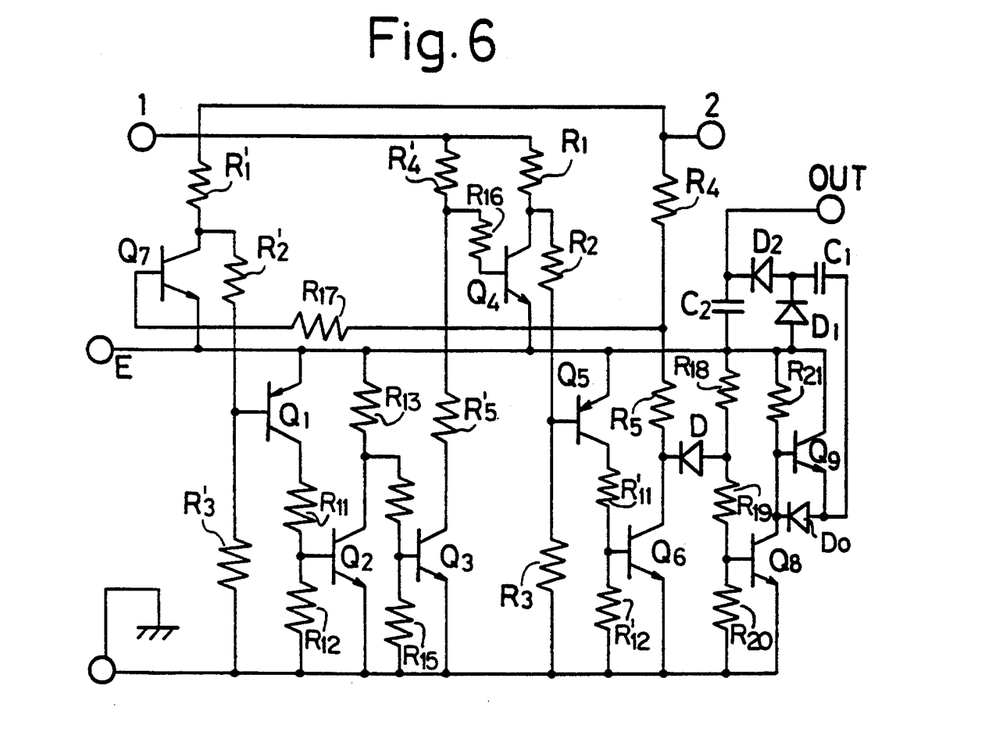
FIG. 6 is a circuit diagram of a logical product calculating circuit illustrating one embodiment of a logical product element of FIG. 3.

FIG. 6 illustrates an embodiment of a logical product calculating circuit that can serve as the logical product element in FIG. 3.

Referring to FIG. 6, R1 to R5 denote resistors, Q1 to Q9 transistors, D, D1 and D2 diodes, and C1 and C2 capacitors. Reference characters E is the power supply voltage of the circuit, 1 and 2 represent input terminals, and OUT denotes an output terminal. Resistors R1-R5, R1'-R5', are part of an oscillation circuit constituted by transistors Q1-Q7, and are used for biasing portions of the oscillation circuit. R17 is a resistance for positively feeding back the output signal of transistor Q6 to the base of transistor Q7.

The logical product calculating circuit of FIG. 6 is configured so that a first transistor (Q7) has a collector connected via a biasing resistor (R1') to one of the input terminals (2) of the logical product calculating circuit. The first transistor also has an emitter connected to a power input terminal (E). A second transistor (Q1) has an emitter connected to the power input terminal and collector grounded via two series-connected resistors (R11, R12), and a base supplied with a collective voltage from the first transistor. This voltage is divided by voltage-dividing resistors (R2', R3') connected between the collector of the first transistor and ground. A third transistor (Q2) has a base supplied from the collector voltage of the second transistor which is voltage-divided by two series-connected resistors (R11, R12), a collector connected via a biasing resistor (R13) to the power input terminal, and a grounded emitter. The fourth transistor (Q3) has a base supplied with the collector voltage of the third transistor which is voltage-divided by two resistors (R14, R15) connected between the collector of the third transistor and ground. The collector of the fourth transistor is connected via two series-connected resistors (R5', R4') to the second input terminal (1). The emitter of the fourth transistor is grounded. A fifth transistor (Q4) has a base supplied by the collector of the fourth transistor voltage-divided by two resistors (R5', R16) connected to the collector of the fourth transistor. The collector of the fifth transistor is connected via a bias resistor (R1) to the other input terminal (1). This connection is made in parallel to the collector of the fourth transistor (Q3). The emitter of the fifth transistor is connected to the power input terminal (E). A sixth transistor (Q5) has a base supplied with the collector voltage of the fifth transistor which is the voltage-divided by two resistors (R2, R3) connected in series between the collector of the fifth transistor and ground. The emitter of the sixth transistor is connected to the power input terminal (E), and the collector is ground via two series-connected resistors (R11', R12'). A seventh transistor (Q6) has a base supplied with the collector voltage of the sixth transistor which is voltage-divided by a voltage-dividing resistor (R11', R12') which is connected between the collector of the sixth transistor and ground. The collector of the seventh transistor is connected via two series-connected biasing resistors (R4, R5) to the first input terminal (2). The emitter of the seventh transistor is grounded. The base of the first transistor (Q7) is fed from the collector voltage of the seventh transistor by means of series-connected voltage dividing resistors (R5, R17). Positive feedback of the output resistor Q6 is controlled by resistor R17.

The operation of this calculating circuit will be briefly described below. When no input voltage is applied to the input terminals 1 and 2, the transistors Q1 and Q5 are in an ON status. When a predetermined voltage is applied to both input terminals 1 and 2, the transistors Q1 to Q7 are repeatedly turned on and off in a specific order to cause oscillation: Q1 OFF→Q2 OFF→Q3 ON→Q4 OFF→Q5 OFF→Q6 OFF→Q7 ON→Q1 ON→ON→Q5 ON→Q6 ON→Q7 OFF→. . . The oscillation output is transferred via the diode D to the transistors Q8 and Q9 for amplification. The amplified output is sent to a voltage multiplying rectifier, constituted by the capacitors C1 and C2 and diodes D1 and D2, and is superimposed on the power supply voltage E there. The resultant output is sent as a DC output through the output terminal OUT. The oscillation condition of this circuit is such that, with V1 and V2 being respectively input voltages to the input terminals 1 and 2, V1 and V2 should satisfy the following.

$$(E<)\frac{R1+R2+R3}{R3}\cdot E < V1 = V2 < \frac{R4+R5}{R5}\cdot E$$

From the above, it is understood that the circuit has a logical product calculating function. In addition, this oscillation circuit has a characteristic that it cannot oscillate when any of the resistors R1-R5 is cut or any of the transistors Q1-Q9 fails. In other words, the oscillation circuit has a fail-safe characteristic that it will not provide a DC output if no input signals are applied to both of the two input terminal, and will not produce an output in response to the input signal to one of the input terminals alone although no logical product holds. The reason to superimpose the amplified output on the power supply voltage E in the rectifying circuit is to provide the input condition to permit the output from the logical product element to oscillate at the subsequent stage when the same logical product elements are cascade-connected. Transistors Q8 and Q9, as well as resistors R18-R21 constitute an amplifier for amplifying the output signal in the oscillation circuit. Diode D is used to connect the oscillation circuit with the amplifier. This amplifier circuit does not oscillate by itself since the feedback circuit is not provided therein. Consequently, an AC output signal is not produced when there is no output signal from the oscillator.

Figure 7:
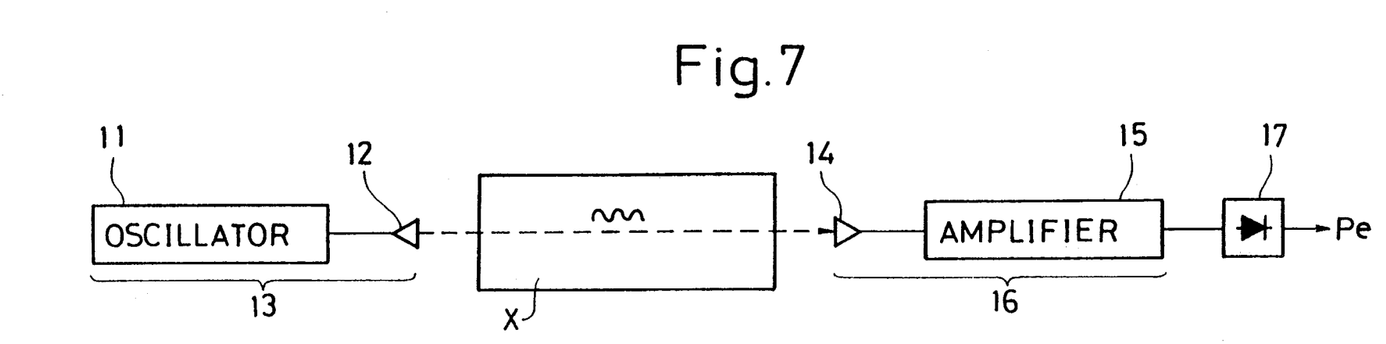
FIG. 7 is a diagram showing the structure of one embodiment of a failsafe sensor.
Figure 8:
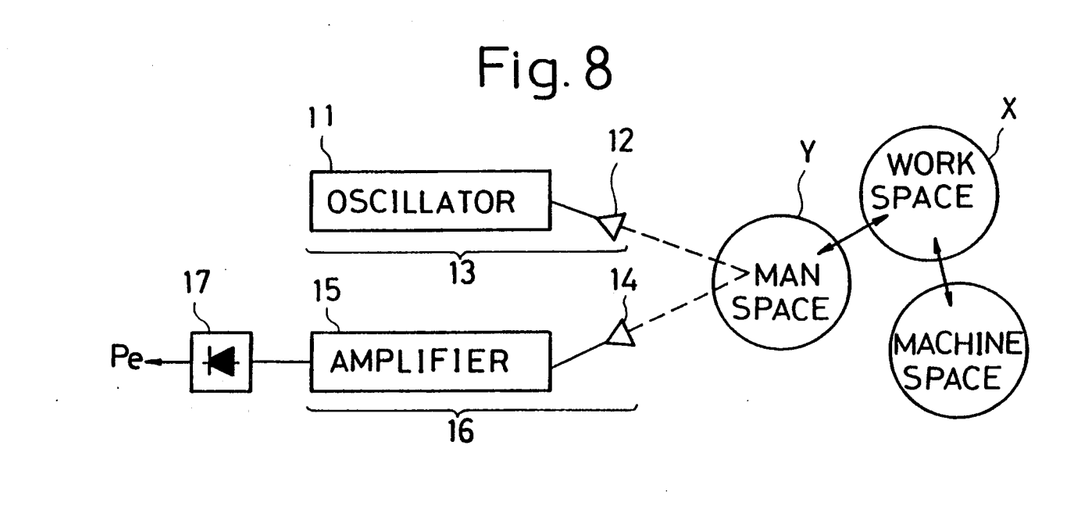
FIG. 8 is a diagram depicting the structure of another embodiment of the fail-safe sensor.

FIGS. 7 and 8 illustrate embodiments of the sensor for detecting safety information.

FIG. 7 shows an embodiment of the sensor in the case of directly monitoring the status of space (work space) the safety in which should be secured.

Referring to this diagram, the sensor includes a light-emitting unit 13, a light-receiving unit 16 and a rectifying circuit 17. The light-emitting unit 13, including an oscillator 11 and a light-emitting element 12, emanates a light beam into the work space X the safety in which should be assured. The light-receiving unit 16, including a light-receiving element 14 and an AC amplifier 15, receives the light beam from the light-emitting unit 13 and produces an output. The rectifying circuit 17 rectifies the AC output from the light-receiving unit 16 and produces a DC output signal Pe.

With the above sensor structure, when an obstruction, such as a worker, is present in the work space X, the light beam from the light-emitting unit 13 is shielded by the worker and will not reach the light-receiving unit 16, rendering the output signal Pe=0. When the worker is not in the work space X, the light beam from the light-emitting unit 13 will reach the light-receiving unit 16, providing the output signal Pe=1.

In contrast to the above embodiment in FIG. 7 for directly monitoring the status in the work space X the safety in which should be secured, the embodiment shown in FIG. 8 is designed for the case of detecting if any man returns to the man space Y or indirectly monitoring the work space X. Like reference numerals as used in FIG. 7 are used to denote corresponding or identical elements in FIG. 8 to avoid their otherwise redundant description.

In this case, when no worker is in the man space Y, the light beam from the light-emitting unit 13 will not be reflected by the worker and will not reach the light-receiving unit 16, providing the output signal Pe=0. When a worker is in the man space Y, the light beam from the light-emitting unit 13 will be reflected by the worker, reaching the light-receiving unit 16, and the signal Pe =1 will be output.

In short, the safe status (S=1) that no workers present in the work space X the safety in which should be assured according to the sensor structure shown in FIG. 7, while the safe status (S=1) means a worker present in the man space Y according to the sensor structure in FIG. 8. In either case, the light beam to be received at the light-receiving element 14 will be received when in the safe status (S=1) and will become a high energy status.

If the sensor having the radar structure shown in FIG. 8 is used in the safety information detecting method shown in FIG. 7, when no workers are present in the work space X or it is in the safe status (S=1), the light beam from the light-emitting unit 13 will not reach the light-receiving unit 16 and no energy will be received there. On the other hand, if the sensor having the light-penetration structure shown in FIG. 7 is used in the safety information detecting method shown in FIG. 8, when a worker is present in the man space Y or it is in the safe status (S=1), the light beam from the light-emitting unit 13 will not reach the light-receiving unit 16 and no energy will be received there. In both cases, to provide the work enable signal Pe=1, a negation circuit is required on the output side of the sensor. The resultant sensor structure is the same as is shown in FIG. 4, which generates the work enable signal Pe=1 even when the condition fails to emit light, so that the sensor may dangerously be considered as having a safe status. That is, the logical relationship S≧Pe does not always hold because negative operations are involved.

From the above, in order to constitute a sensor for detecting safety information, the safety information (S=1 for the safe status and S=0 for the dangerous status) should coincide with the status of the received energy of the sensor, and it is necessary to use a sensor that detects the safe status in terms of the high energy status. This is apparent from the sensor shown in FIG. 9.

Figure 9:
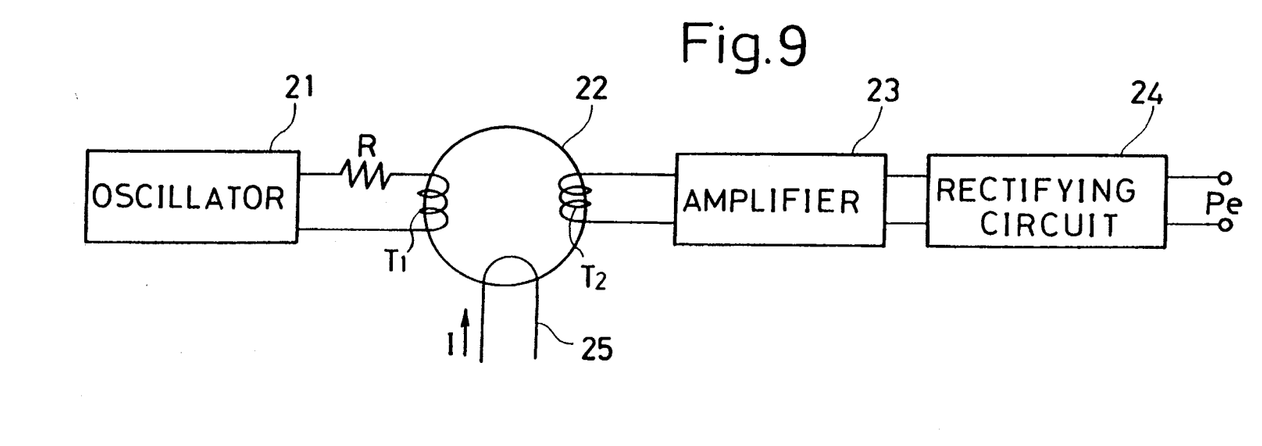
FIG. 9 is a diagram illustrating the structure of a further embodiment of the fail-safe sensor.

The sensor in FIG. 9 is effective in a safety system which cuts off the power supply when the current erroneously flows to the motor to drive the robot's movable section, while the robot maintenance is being conducted by workers in the vicinity of the movable section in a hold status of the robot (status in which the movable section is stopped by a stop signal from the machine side with power on)

The sensor includes an oscillator 21, a resistor R, a saturable magnetic core 22, an amplifier 23, a rectifying circuit 24 and a power line 25 for a motor (not shown)

for driving the movable section of a machine. The oscillator 21 generates an AC output. The magnetic core 22 has a primary winding T1 and a secondary winding T2 wound around. The primary winding T1 is connected through the resistor R to the oscillator 21. The secondary winding T2 receives an AC signal running through the primary winding T1. The amplifier 23 amplifies the output of the secondary winding T2. The rectifying circuit 24 rectifies an AC output signal from the amplifier 23. The power lines 25, wound around the magnetic core 22, carries a current I to the motor.

In the sensor with the above structure, when the current 1 is not flowing through the power line 25, the AC signal from the primary winding T1 is received at the secondary winding T2 to generate the output signal Pe. In case that the current I erroneously flows through the power line 25, the magnetic core 22 will become saturated so that the AC signal from the primary winding T1 will not be sent to the secondary winding T2.

In other words, in the safe status (S=1) in which no motor current flows, the input energy to the secondary winding T2 is high, providing the enable signal Pe=1, while in the dangerous status (S=0) where the motor current erroneously flows to be likely to move the movable section, there will be no energy, providing the enable signal Pe=0. If the power line 25 is disconnected, the enable signal Pe=1 will be always generated. In this case, however, the enable signal Pe=1 is actually equivalent to the enable signal Pe=0 because the current I produced by the motor drive command Pe=1 will not be carried by the disconnected power line 25 to the motor.

Besides the above-described sensor which detects safety information depending on whether or not externally-applied energy is present, there is a direct-acting type sensor which directly detects the energy of a detection target, such as a solar battery, a microphone for extracting noise, or a temperature sensor. If an infrared sensor, one of the direct-acting type sensors, which detects infrared rays irradiated from a human body, is used as the sensor in FIG. 7 or 8. Then, according to the system in FIG. 7 which considers no workers present as the safe status, it is safe when there is no received energy. To represent the safe status by a logical value of 1, a negation circuit is required. Therefore, such a sensor is effective in safety system in FIG. 8 that indirectly monitors space the safety in which should be secured, but cannot be applied to the safety system in FIG. 7 that directly monitors the space.

Figure 10:
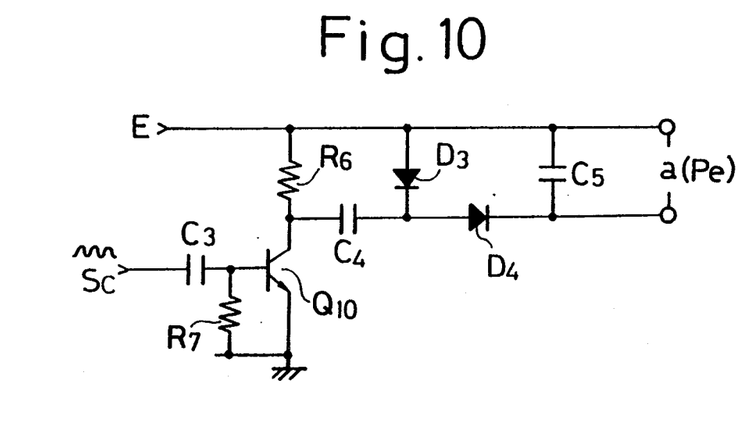
FIG. 10 is a circuit diagram illustrating an embodiment of an amplifying circuit and a rectifying circuit to make the sensor fail-safe.

One way to design these sensors to be fail-safe is to generate an AC signal on the sender side and amplify the AC signal on the receiver side. FIG. 10 illustrates an embodiment of an amplifying circuit and a rectifying circuit on the receiver side in this case.

Referring to FIG. 10, C3 to C5 denote capacitors, R6 and R7 resistors, D3 and D4 diodes, and Q10 a transistor. The resistors R6 and R7 and the transistor Q10 constitute an emitter-grounded AC amplifier. The capacitors C3–C5 and the diodes D3 and D4 constitutes a voltage multiplying rectifier. Reference character E is the power supply voltage for the AC amplifier, and reference character a is the output voltage of the rectifying circuit. The work enable signal Pe=1 when the output voltage a is present (that is, when the potential is a>E), and Pe=0 when it is not provided (that is, when a is the potential E or zero). Sc denotes an AC input signal to be put into the amplifier in the light-receiving unit 16.

With the above structure, when the resistor R6 or R7, or transistor Q10 fails due to possible line disconnection or short-circuiting, no AC signal will be produced. The output signal of the amplifier (collector output signal of the transistor Q10) is superimposed on the power supply voltage E by the capacitor C4 and diode D3, a constituent of the rectifying circuit. If any of the electrical elements constituting the circuit shown in FIG. 9 fails, therefore, the output signal a of the rectifying circuit, which is (E+Sc) and higher than the power supply voltage E, will be never produced will not be produced when no input signal Sc is applied. That is, this sensor has a fail-safe structure. When the capacitor C4, for example, is short circuited, the voltage across the terminals of the diode D3 will never exceed the power supply voltage E. When the diode D3 is disconnected, the discharge route of the capacitor C4 will disappear and the output signal a will not be produced. When the diode D4 is short circuited and the capacitor C5 is disconnected, the output signal a will become an alternating-current signal, but this alternating-current signal will never be generated in the absence of the input signal Sc. Of course, no output will be produced when the capacitor C5 or diode D3 is short circuited or when the diode D4 or capacitor C4 is disconnected. The output signal a of the rectifying circuit will be produced at a level higher than the power supply voltage E and will be able to become an input signal to the logical product calculating circuit shown in FIG. 6

As described above, according to the present invention, the safety of machine-working space is detected by a sensor, a work enable signal to permit the movable section of a machine to move is generated when the safety is confirmed, and the machine's movable section can move only upon generation of the work enable signal. This system will not therefore issue the work enable signal and inhibits the machine's movable section from moving when the sensor fails, thus ensuring safe working environments, as compared with the conventional system which stops moving the machine's movable section upon detection of the dangerous status, and cannot detect the dangerous status when the sensor fails, which may dangerously move the movable section of the machine.

What is claimed is:

1. A safe work assuring method for assuring safety of a worker in work space where the worker works in cooperation with a machine, comprising steps of:

detecting a safe status of the worker by receiving an AC input signal at a high level;

detecting a dangerous status of the worker by receiving the AC input signal at a low level including zero;

generating an output signal at a logical value of 1, indicative of the safe status and corresponding to a high energy status, upon reception of the AC input signal at the high level;

generating said output signal at a logical value of 0, indicative of the dangerous status and corresponding to a low energy status, upon reception of the AC input signal at the low level including zero;

detecting the safe and dangerous status of the worker by using a sensor in which a sensor output signal is extinguished when the sensor fails, and a logical value of 0 is indicated, irrespective of the level of the AC input signal received thereby;

performing a logical product calculation of the sensor output signal, wherein a logical value of 1 is indicative of a safe status of the sensor, and a work enable signal of a logical value of 1 on a machine side, by using a logical product element having a logical output signal which cannot erroneously come to a logical value of 1; and generating a work executing energy for the work space on the machine side on the basis of the logical product calculation.

2. A safe work assuring method according to claim 1, wherein the sensor generates the sensor output signal indicative of the safe status as a logical values of 1, corresponding to the high energy status, only when the sensor detects a status in which no workers are present in the work space.

3. A safe work assuring method according to claim 1, wherein the sensor generates the sensor output signal indicative of the safe status as the logical value of 1 corresponding to the high energy status, only when the sensor detects a status in which the worker is present in a safe space other than the work space.

4. A safe work assuring apparatus for assuring safety of a worker in work space where the worker works in cooperation with a machine, comprising:

a sensor for detecting a safe status of the worker by receiving an AC input signal at a high level, detecting a dangerous status of the worker by receiving the AC input signal at a low level including zero, amplifying and rectifying an AC signal based on the AC input signal, generating a rectified output signal indicative of the safe status as a logical value of 1 upon reception of the AC input signal at the high level, generating a rectified output signal indicative of the dangerous status as a logical value of 0 upon reception of the AC input signal at the lower level including zero, and making the rectified output signal come to a logical value of 0 when the sensor fails; and a logical product element having two input signals, in which the rectified output signal of the sensor is one input signal, a work enabling signal on the machine is the other input signal and the rectified output signal comes to a logical value of 0 when the logical product element fails, an output signal of the logical product element being a drive signal for generating work executing energy on a movable section of the machine.

5. A safe work assuring apparatus according to claim 4, wherein the sensor includes:

a light-emitting unit for emanating a light beam in the work space;

a light-receiving unit for receiving the light beam from the light-emitting unit when no workers are present in the work space, and generating an AC output signal; and a rectifying circuit for superimposing the AC output signal from the light-receiving unit on a power supply voltage, rectifying the superimposed AC output signal and generating a DC output signal.

6. A safe work assuring apparatus according to claim 4, wherein the sensor includes:

a light-emitting unit for emanating a light beam in safe space other than the work space;

a light-receiving unit for receiving the light beam from the light-emitting unit, reflected by a worker, when the worker is in a safe space, and generating an AC output signal; and a rectifying circuit for superimposing the AC output signal from the light-receiving unit on a power supply voltage, rectifying the superimposed AC output signal and generating a DC output signal.

7. A safe work assuring apparatus according to claim 4, wherein the sensor includes:

a saturable magnetic core having a primary winding in which an AC signal is input and a secondary winding for receiving the AC signal from the primary winding and generating an output; and a power line, wound around the magnetic core, for carrying a drive current for a motor driven by the drive signal to drive the movable section of the machine, whereby when the drive current does not flow through the power line, the magnetic core is not saturated and the AC signal of the primary winding is sent to the secondary winding to provide an output signal of a logical value of 1 indicative of a safe status at said secondary winding, and when the drive current flows through the power line, the magnetic core is saturated and the AC signal of the primary winding is not sent to the secondary winding to provide an output signal of a logical value of 0 indicative of a dangerous status at the secondary winding.

8. A safe work assuring apparatus according to claim 4, wherein an output signal is generated by the sensor and superimposed on a power supply voltage, the logical product element produces a high level output signal indicative of a safe status in the work space only when an input signal of a higher level than that of the power supply voltage is applied to two terminals of the logical product element so that the logical product element produces an output indicative of a dangerous status in the work space when the sensor fails.

9. A safe work assuring apparatus according to claim 8, wherein the logical product element comprises:

a first transistor having a collector connected via a resistor to one of the input terminals of the logical product element, and an emitter connected to a power input terminal;

a second transistor having an emitter connected to the power input terminal, a collector grounded via two series-connected resistors, and a base supplied with a collector voltage of the first transistor which is divided by a voltage-dividing resistor provided between the collector of the first transistor and a ground;

a third transistor having a base supplied with a collector voltage of the second transistor which is divided by the two series-connected resistors, a collector connected via a resistor to the power input terminal, and an emitter grounded;

a fourth transistor having a base supplied with a collector voltage of the third transistor which is divided by two resistors connected between the collector of the third transistor and the ground, a collector connected via two series-connected resistors to the other input terminal, and an emitter grounded;

a fifth transistor having a base supplied via a resistor with a collector voltage of the fourth transistor which is divided by two resistors connected to the collector of the fourth transistor, a collector connected via a resistor to the other input terminal in parallel to the collector of the fourth transistor, and an emitter connected to the power input terminal;

a sixth transistor having a phase supplied with a collector voltage of the fifth transistor which is divided by two resistors connected in series between the collector of the fifth transistor and the ground, an emitter connected to the power input terminal, and a collector grounded via two series-connected resistors; and a seventh transistor having a based supplied with a collector voltage of the sixth transistor which is divided by a voltage-dividing resistor connected between the collector of the sixth transistor and the ground, a collector connected via two series-connected resistors to the one of the input terminals and an output terminal, and an emitter grounded, an input voltage to be applied to said one of the input terminals, which is voltage-divided by series-connected resistors connected to the collector of the seventh transistor, being input via a resistor to the base of the first transistor.

* * * * *